United States Patent
Vogel et al.

(10) Patent No.: US 8,814,701 B2
(45) Date of Patent: Aug. 26, 2014

(54) ARTIFICIAL INTELLIGENCE AVATAR TO ENGAGE PLAYERS DURING GAME PLAY

(71) Applicant: SAP AG, Walldorf (DE)

(72) Inventors: Andreas Vogel, San Francisco, CA (US); Christian Scheelen, Palo Alto, CA (US); Shailesh Jannu, Palo Alto, CA (US)

(73) Assignee: SAP AG, Walldorf (DE)

( * ) Notice: Subject to any disclaimer, the term of this patent is extended or adjusted under 35 U.S.C. 154(b) by 17 days.

(21) Appl. No.: 13/659,517

(22) Filed: Oct. 24, 2012

(65) Prior Publication Data

US 2013/0316834 A1    Nov. 28, 2013

Related U.S. Application Data

(60) Provisional application No. 61/651,428, filed on May 24, 2012.

(51) Int. Cl.
*A63F 9/24* (2006.01)
*G07F 17/32* (2006.01)
*G06F 17/40* (2006.01)

(52) U.S. Cl.
CPC .............. *G07F 17/32* (2013.01); *G06F 17/40* (2013.01)
USPC ............................................. 463/42

(58) Field of Classification Search
USPC .................. 463/16, 25, 42, 43; 705/14.12
See application file for complete search history.

(56) References Cited

U.S. PATENT DOCUMENTS

| | | | |
|---|---|---|---|
| 7,035,653 B2 * | 4/2006 | Simon et al. | 455/466 |
| 2003/0109305 A1 * | 6/2003 | Gavin et al. | 463/31 |
| 2005/0143174 A1 | 6/2005 | Goldman et al. | |
| 2005/0153767 A1 | 7/2005 | Gauselmann | |
| 2007/0082738 A1 * | 4/2007 | Fickie et al. | 463/42 |
| 2010/0041475 A1 * | 2/2010 | Zalewski et al. | 463/30 |
| 2010/0324908 A1 * | 12/2010 | Rosser et al. | 704/270 |
| 2012/0040761 A1 * | 2/2012 | Auterio et al. | 463/42 |
| 2012/0122570 A1 * | 5/2012 | Baronoff | 463/31 |
| 2012/0238353 A1 * | 9/2012 | Herrmann et al. | 463/25 |
| 2013/0005438 A1 * | 1/2013 | Ocko et al. | 463/25 |
| 2013/0005447 A1 * | 1/2013 | Lutnick et al. | 463/25 |
| 2013/0029766 A1 * | 1/2013 | Wickett et al. | 463/42 |
| 2013/0079120 A1 * | 3/2013 | Walker et al. | 463/25 |
| 2013/0095460 A1 * | 4/2013 | Bishop | 434/308 |
| 2013/0095927 A1 * | 4/2013 | Rietman | 463/42 |

* cited by examiner

*Primary Examiner* — William Brewster
*Assistant Examiner* — Jason Skaarup
(74) *Attorney, Agent, or Firm* — Fountainhead Law Group PC

(57) ABSTRACT

A gaming system may include an event filter to identify a player as a target for engagement. The gaming system may engage the player in a dialogue with a non-player character to conduct a discussion with the player relating to the events that resulted in engaging the player. In some embodiments, the dialogue may include a pre-event game analysis. The dialogue may include recommendations or suggestions for improving the player's performance, and may include offering virtual game items to the player.

20 Claims, 13 Drawing Sheets

Game Buddy                                              Player

Hey buddy, RIP!

Thx man.

You didn't have much of chance
against that guy. Just look at the chart

Yeah, not much I could do.

You better work on keeping a lock the
target. Wanna do some practice
sessions?

Sure.

OK, let's go.

US 8,814,701 B2

ARTIFICIAL INTELLIGENCE AVATAR TO ENGAGE PLAYERS DURING GAME PLAY

CROSS REFERENCE TO RELATED APPLICATIONS

The present disclosure claims priority to U.S. Provisional App. No. 61/651,428 filed May 24, 2012, the content of which is incorporated herein by reference in its entirety for all purposes. The present disclosure is related to the following commonly owned, concurrently filed applications, the disclosure of each of which is hereby incorporated by reference in its entirety for all purposes:
   U.S. application Ser. No. 13/659,551, entitled "PREDICTIVE ANALYTICS FOR TARGETED PLAYER ENGAGEMENT IN A GAMING SYSTEM"
   U.S. application Ser. No. 13/659,583, entitled "PLAYER SEGMENTATION BASED ON PREDICTED PLAYER INTERACTION SCORE"
   U.S. application Ser. No. 13/659,613, entitled "PREDICTIVE ANALYSIS BASED ON PLAYER SEGMENTATION"

BACKGROUND

Unless otherwise indicated herein, the approaches described in this section are not prior art to the claims in this application and are not admitted to be prior art by inclusion in this section.

Online gaming is becoming a significant business enterprise. The Internet makes gaming accessible to players around the world. However, challenges exist to convert "free" players into "paying" players and to maintain a steady revenue from players. For example, reducing the churn rate (i.e., the number of players who leave the game after playing and never return) increases the likelihood of more paying players. Challenges exist for popularizing a game. Players may be discouraged if a game is too difficult to play. On the other hand, players may quickly loose interest if game play is not sufficiently challenging.

DETAILED DESCRIPTION

Disclosed embodiments relate to a gaming system that fosters player engagement with the gaming system in order to optimize the player's game play experience in a way that is mutually beneficial to the player and to an enterprise that operates gaming system. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
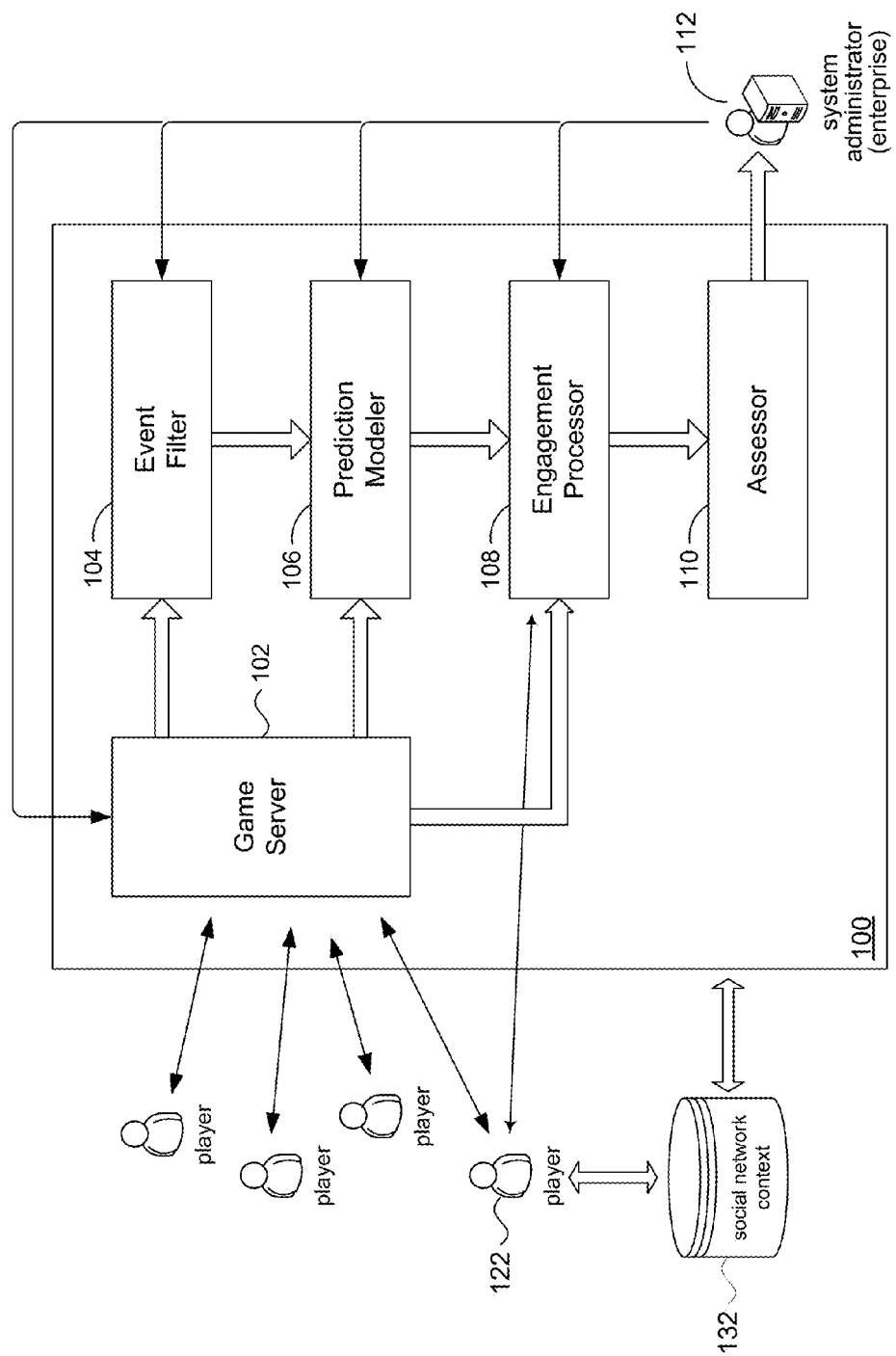
FIG. 1 shows a high-level system diagram of a gaming system according to the present disclosure.

FIG. 1 is a high level block diagram of a gaming system 100 in accordance with principles of the present disclosure. In some embodiments, the gaming system 100 may include a game server 102, an event filter 104, a prediction modeler 106, an engagement processor 108, and an assessor 110. The gaming system 100 may be hosted or otherwise operated by an enterprise ("game publisher", not shown). In some embodiments, the game may be an online game that players log onto in order to enter the game; an example of online gaming systems are known as massively multiplayer online role-playing games (MMORPGs). The gaming system 100 may be free for new users, but may require payment for continued play. Players may purchase game items (e.g., weapons, ammo, transportation, etc.) in order to facilitate their progress in the game, and so on.

The game server 102 may provide a game infrastructure and game mechanics to support game play among players of the game, such as supporting a gaming environment within which players may interact with each other and with elements of the game (e.g., "game elements" such as structures, non-player characters—NPCs, and so on), maintaining and managing state changes in the gaming environment, providing interfaces for players, and so on. Events (game events) may occur during game play. For example, players' actions may cause game events; changes in a player's state may result in a game event (player dies, levels up, and so on), changes in the states of the game elements may cause game events (e.g., a weapon runs out of ammo), and so on.

Game events generated by the game server 102 during game play may be provided to the event filter 104. In accordance with the present disclosure, the event filter 104 may identify a player (e.g., player 122) based on one or more game events that occur during game play. The game event may be as simple as the player logging on to the game, or that the player has been killed, or is trapped somewhere, and so on. The game event that triggers the identification of the player may arise from the occurrence of a series of other game events involving the player or other players, or events involving game elements. In some embodiments, the event filter 104 may identify a group of players. Though the remaining description assumes the event filter 104 has identified one player, the discussion may apply equally to a group of identified players.

The prediction modeler 106 may model player behaviour to assess how likely a player (e.g., player 122) is to exhibit a specific behaviour under a given set of circumstances during game play. The prediction modeler 106 may then output one or more predictions of what the player may do (outcomes). The game server 102 may provide state information and game events generated during game play to the prediction modeler 106 as a basis for making one or more predictions about what the player may do in given their situation in the game.

The predicted outcome(s) of the prediction modeler 106 may then feed into the engagement processor 108. Based on predictions made by the prediction modeler 106 and other factors such as relevant game context and social network context 132, for example, the engagement processor 108 may generate engagement activity to engage the player. For example, the engagement activity may include actions relating to game play, actions involving commercializing aspects of game play (e.g., becoming a paying player, purchase virtual items, etc.), targeted advertising, and so on.

The assessor 110 may be used to facilitate making adjustments in various components in the gaming system 100. In some embodiments, the assessor 110 may collect data from the engagement processor 108, which may be used to assess the effectiveness of the engagement activities produced by the engagement processor. A system administrator 112 may be someone in the enterprise who can make adjustments to one or more components in the gaming system 100 based on information provided by the assessor 110. In some embodiments, the system administrator 112 is a human operator, and in other embodiments the system administrator 112 may include some degree of automation.

Figure 2:
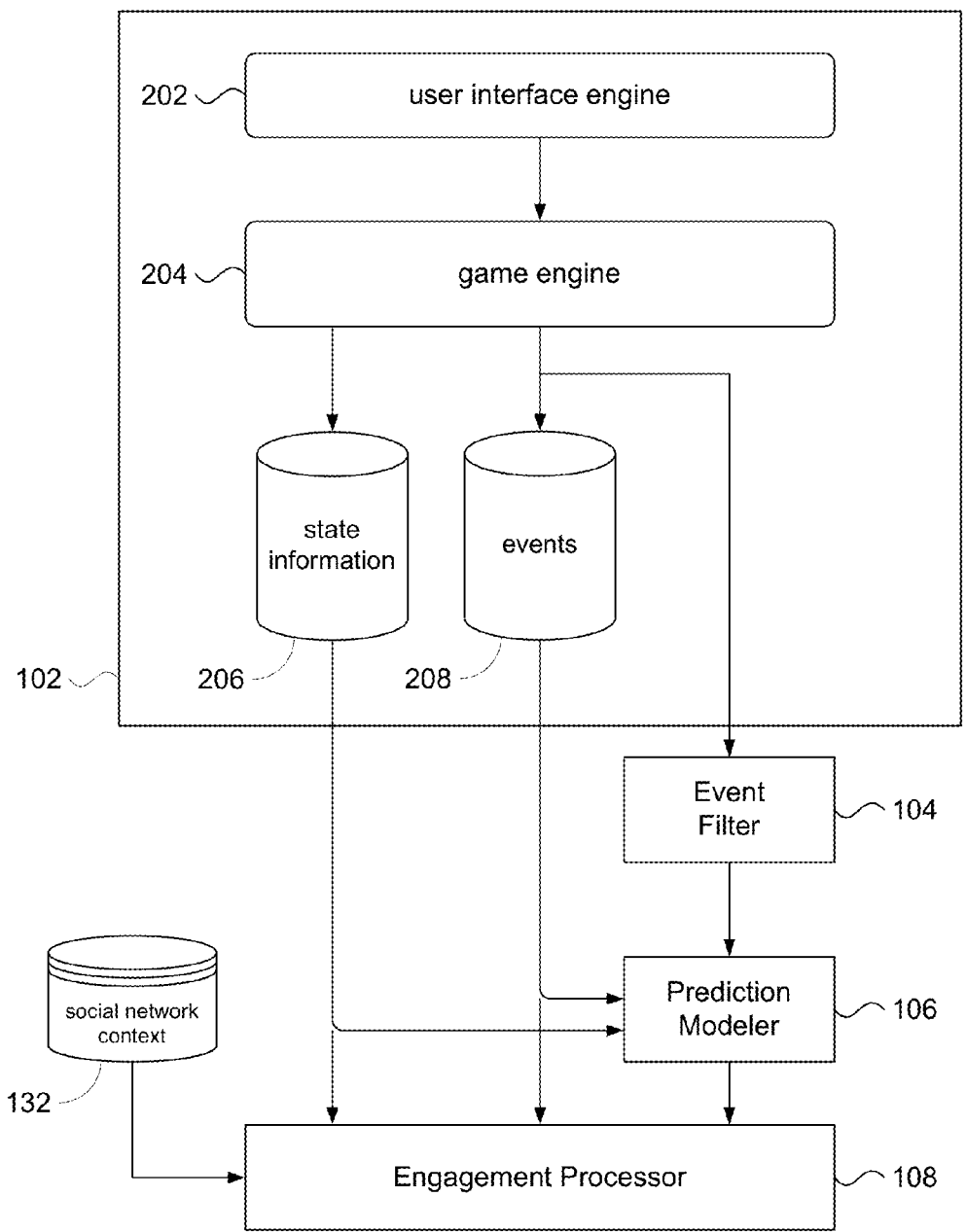
FIG. 2 shows details of the game server shown in FIG. 1.

FIG. 2 shows some additional details of the game server 102 in accordance with the present disclosure. The game server 102 may include a user interface engine 202, a game engine 204, a state information data store 206, and a game events data store 208. The user interface engine 202 may provide graphics rendering capability to produce video and other display information for game play. Input processing from various input devices (e.g., mouse device, keyboard, and so on) may be processed through the user interface engine 202. Access to the gaming system 100 may be provided over the Internet (e.g., via a web browser) or a game application (e.g., executing on a computing device such as a laptop computer, a smartphone, a computer tablet, and so on). For example, the user interface engine 202 may provide a Web services interface for access over the Web. In some embodiments, the user interface engine 202 may interface with a player's game console over the Internet.

The game engine 204 may provide rules processing, event generation and processing, game mechanics, a game environment, and other game infrastructure to manage game play. Players and the game environment (e.g., non-player game elements, and the like) have states (e.g., player is alive and has 1000 experience points, a structure has be destroyed, etc.) that change during game play. The game engine 204 may manage these state changes (collectively referred to as "game state") according to game rules which govern game play. The state information data store 206 may store and manage the game state, including current game state information of the players (e.g., health levels, experience levels, location, possessions, achievements, etc.) and current game state information of the game environment (e.g., number of players in the game, health levels of game elements such as structures and creatures, time of day in the game, etc.).

The game engine 204 may identify the occurrence of game events during game play. In some embodiments, game events may be defined by the game rules. When a game event is deemed to have occurred, the game engine 204 may issue an event (e.g., an event message) to other elements of the game engine. In some embodiments, the game engine 204 may store generated game events in the event data store 208. The game engine 204 may include a time base to synchronize the game state and the game events. Game play may be recorded by storing all the game state changes and game events in the data stores 208, 206.

The game engine 204 may provide the game events to the event filter 104 in addition to being stored in the events data store 208. Game state information and game events may be accessed by the predication modeler 106 via the state information data store 206 and the events data store 208, respectively. The prediction modeler 106 may use game state information and game events to predict the behaviour of a player (e.g., player 122) identified in the event filter 104. By using the current game state of the game environment and the players in the game, the prediction modeler 106 can make a prediction of the what the player is likely to do.

Likewise, the engagement processor 108 may access the state information data store 206 and the events data store 208 to inform the process of generating one or more engagement actions for engaging with the player. The engagement processor 108 may access the social network context 132 to further inform the process of generating suitable engagement actions. By using the current game state and current state of the player, the engagement processor 108 may generate engagement activity that is highly relevant to the player's current situation in the game, thus encouraging engagement by the player who may benefit from the engagement.

Figure 3:
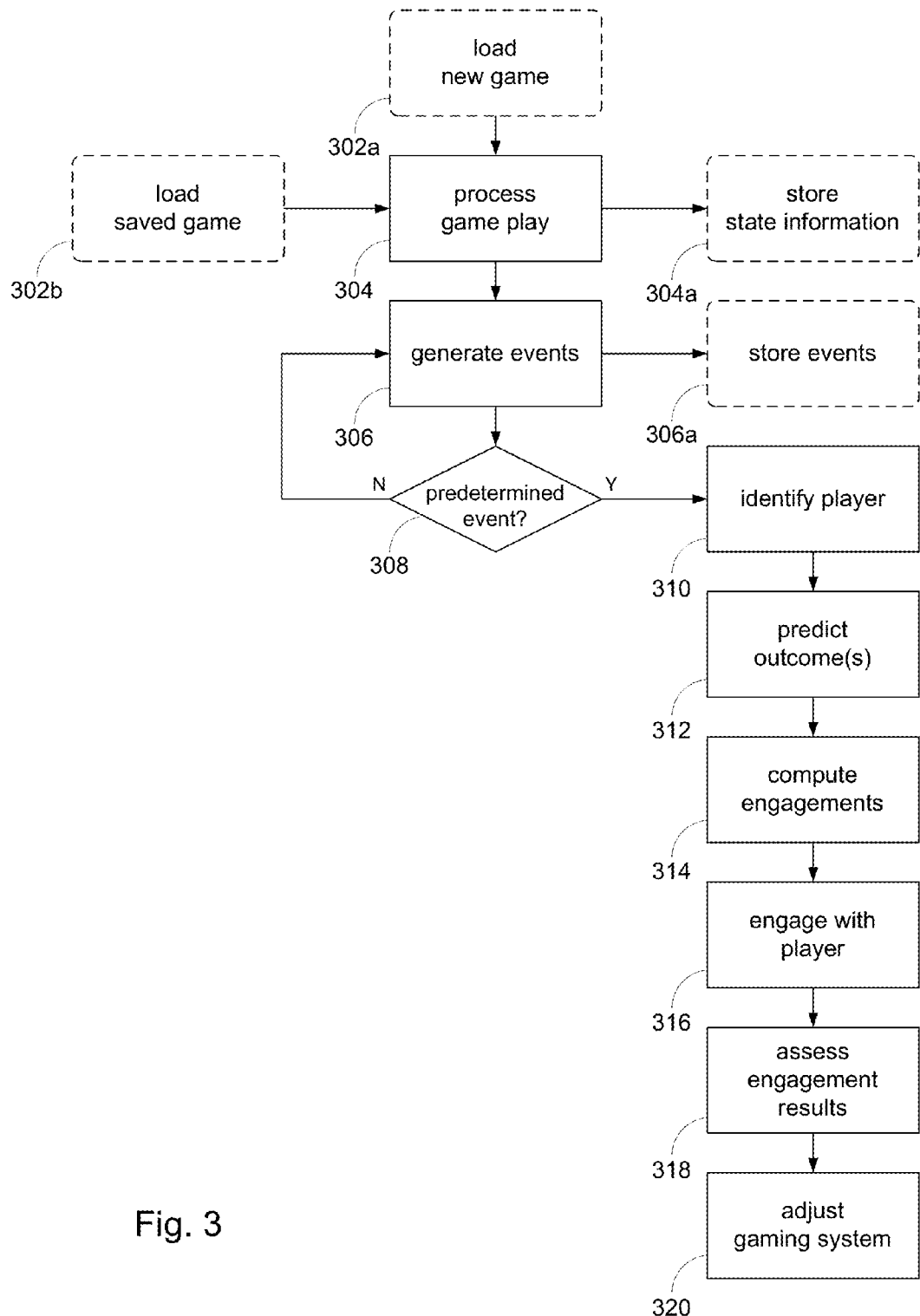
FIG. 3 depicts a workflow within the gaming system according to the present disclosure.

Referring to FIG. 3, a workflow in the gaming system 100 in accordance with the present disclosure includes loading a game. The gaming system 100 may load new game 302a, or the gaming system may load a previously saved game at 302b. At 304, the gaming system 100 may process game play. In the case of a newly initialized game (at 302a), the gaming system 100 may manage game play as players interact with each other in the game environment or with elements in the game environment from the game's initial game state.

If a previously saved game was loaded (at 302b), the gaming system 100 may continue with game play from the game state at the save point. Changes in the state of the players and in the game environment as game play progresses, whether in a new game or from a saved game, may be stored (at 304a) in the state information data store 206. On the other hand, if the previously saved game that was loaded at 302b is simply being replayed, as one would replay a previously recorded video recording, then the processing of game play at 304 will not include storing state information (304a) since no changes of state will occur by simply replaying the previously saved game.

At 306, the game engine 204 may generate game events as game play progresses, whether in a new game or from a previously saved game. Any occurrence in the game environment or with the players during game play may be treated as a game event. In some embodiments, the occurrence of a series of game events may be treated as a game event. At 306a, game events generated during game play may be stored in the event data store 208. On the other hand if a previously saved game is simply being replayed, then processing at 306a is not needed since game events generated at 306 are simply the result of replaying a previously recorded game.

In some embodiments, processing from 308 and following may proceed irrespective of whether the game is being played out or a previously saved game is being replayed. Game events are presented to the event filter 104. The event filter 104 monitors game events and looks for predetermined game events at 308. In accordance with the present disclosure, the event filter 104 serves to identify a player at 310 based on certain game events. The player becomes the target of an engagement, for example, to encourage the player to increase their participation in the game. The event filter 104 may be triggered based on situational game events. For example, when a new player first logs onto the game, the event filter 104 may identify that player as a target for engagement. If the player levels up, or if the player has died for the fifth time, and so on, the event filter 104 may be triggered to identify the player associated with the event as a target for engagement. The event filter 104 may be triggered based on temporal game events; e.g., the player has played for six straight hours, or it has been 48 hours since the player registered as a new player, or the player reached a certain level within a certain period of time, and so on. A game event may be triggered if the player has not logged into the game for some period of time.

When the event filter 104 has identified a player at 310, the prediction modeler 106 may be invoked at 312 to make one or more predictions (outcomes) as to what the player may do under the given circumstances. For example, if a player is killed during game play, that game event (death of a player) may be used to identify the player as a subject for the prediction modeler 106.

In some embodiments, the prediction modeler 106 may implement and evaluate any one or more known predictive algorithms, such support vector machines, linear regression models, decision trees, etc., to model the player's behaviour. Inputs (prediction variables) to the prediction modeler 106 depend on the particular algorithms and on the training data used to develop the models. Accordingly, prediction variables may be based on game events that occur during game play, the player's game state, the game state of other players, the state of the game environment, and so on.

In some embodiments, outcomes of interest that may be predicted by the predictive algorithms may include the player quitting the game, the player making an initial payment to continue playing the game, the player purchasing a game item, and so on. A player may be predicted to make payments for multiple categories of virtual items. In other embodiments, outcomes may indicate the player is likely to purchase real-life items (e.g., a T-shirt, instruction booklets), and so on. In some embodiments, the predictive algorithms may adapt over time in order to change the nature of the outcomes that are predicted. For example, a predicted outcome for a new player may be a decision to register as a paying player, whereas a player who has played for some number of months may be predicted to purchase high-end gaming items in order to advance or otherwise enhance their game play.

The outcome(s) predicted by the prediction modeler 106 may then be processed by the engagement processor 108, at 314, to generate engagement activities, such presenting one or more recommendations or suggestions, offers to purchase real or virtual items, and so on with which to engage the player. For example, suppose the player was identified by the death of the player, the engagement activity may be a recommendation to the player to take some action to avoid dying on the next go around. The engagement may be to offer the player to buy a virtual item; e.g., a weapon, or a potion, etc. In general, the engagement processor 108 may generate some form of engagement activity to engage the player identified at 310 and modeled at 312 to encourage continued interest in the game, to further their progress in the game, and so on.

In some embodiments, the engagement processor 108 may comprise a hybrid recommender system. Hybrid recommender systems are known and may comprise a combination of two or more single recommender systems. The engagement processor 108 may include expert rule processing to process the game context to further inform the process of generating the engagement activity. As a simple example, suppose the predicted outcome indicates that the player is likely to purchase items from the game. If the current game environment is that the player is in a burning building and the player is very low on health, then the engagement processor 108 may generate an engagement action comprising an offer to sell a "transport spell" to the player so that the player can teletransport out of the burning building.

In some embodiments, the engagement processor 108 may incorporate information from a social network context 132 to further inform the process of generating a suitable engagement activity. For example, the social network context 132 may comprise of a list of players who are teamed up with the identified player in a cooperative game, or a list of players with whom the identified player communicates in the game. The game mechanics may provide a formal social networking infrastructure within the game environment. The engagement processor 108 may generate engagement activity based on actions of the other players in the identified player's social network. For example, if other players in the identified player's social network encountered the same situation confronting the identified player, the engagement activity may be a hint as to what those players did to resolve the situation.

It can be appreciated from the foregoing examples that the engagement activity may be any kind of engagement with the player, and is not limited to selling items to the player. The engagement activity may include providing tips for game play, introducing the player to other players, and so on to help the player succeed in the game and thus continue playing the game. The engagement activity may serve to reduce the likelihood of churn; i.e., the player leaving the game. For example, the player may leave the game if they become bored or frustrated. Accordingly, the engagement activity may present new challenges to the player, or may include tips and tricks to overcome an obstacle that may be the source of frustration. And so on.

The engagement activity generated in 314 may then be put into action at 316. For example, if the player has been killed, the gaming system 100 may respawn the player and engage the player by providing hints, offering weapons, and so on before the player re-enters the game. The engagement may simply pop up on the player's interface; e.g., in a pop up window. For example, if the player has been stuck in a situation for some period of time (e.g., appears to be lost in building), an engagement action may include popping up a window and offering a suggestion on what to do. The player may be engaged in an off-line manner. For example, an email may be sent to the player, a text message may sent to the player, and so on.

The assessor 108 may assess the effectiveness of the engagements, at 318. For example, the assessor 108 may track the success rate of engagement actions that are offers to sell a particular gaming item. The tracking information may include the circumstances under which the offer was made, the players' game states, the pricing structure, and so on. The assessor may track different kinds of advice that were given to players and what happened with those players (did they leave, did they buy things, etc.). The assessments may be displayed on a display device, or a report may be generated, and so on.

At 320, the system administrator 112 may make adjustments to the gaming system 100. In some embodiments, the system administrator's adjustments may be based on the assessments made by the assessor 108 at 318. Generally, any aspect of the gaming system 100 may be adjusted. For example, the game server 102 may be adjusted to change the difficultly level of some game elements, the pricing and price structure of virtual items may be changed. The event filter 104 may be adjusted to identify new types of players for targeting engagements. New prediction algorithms may be added to the prediction modeler 106, or existing algorithms may be tuned in order to improve prediction accuracy. The engagement processor 108 may be adjusted to refine the engagement activity, for example, to apply certain engagements for certain groups of players, alter the way the different players are engaged such as whether to engage during game play or offline, etc. The adjustments serve as feedback into the gaming system 100, thus tuning the gaming system to provide the best gaming experience for players while at the same providing opportunities to improve the revenue stream from the gaming system.

Figure 4:
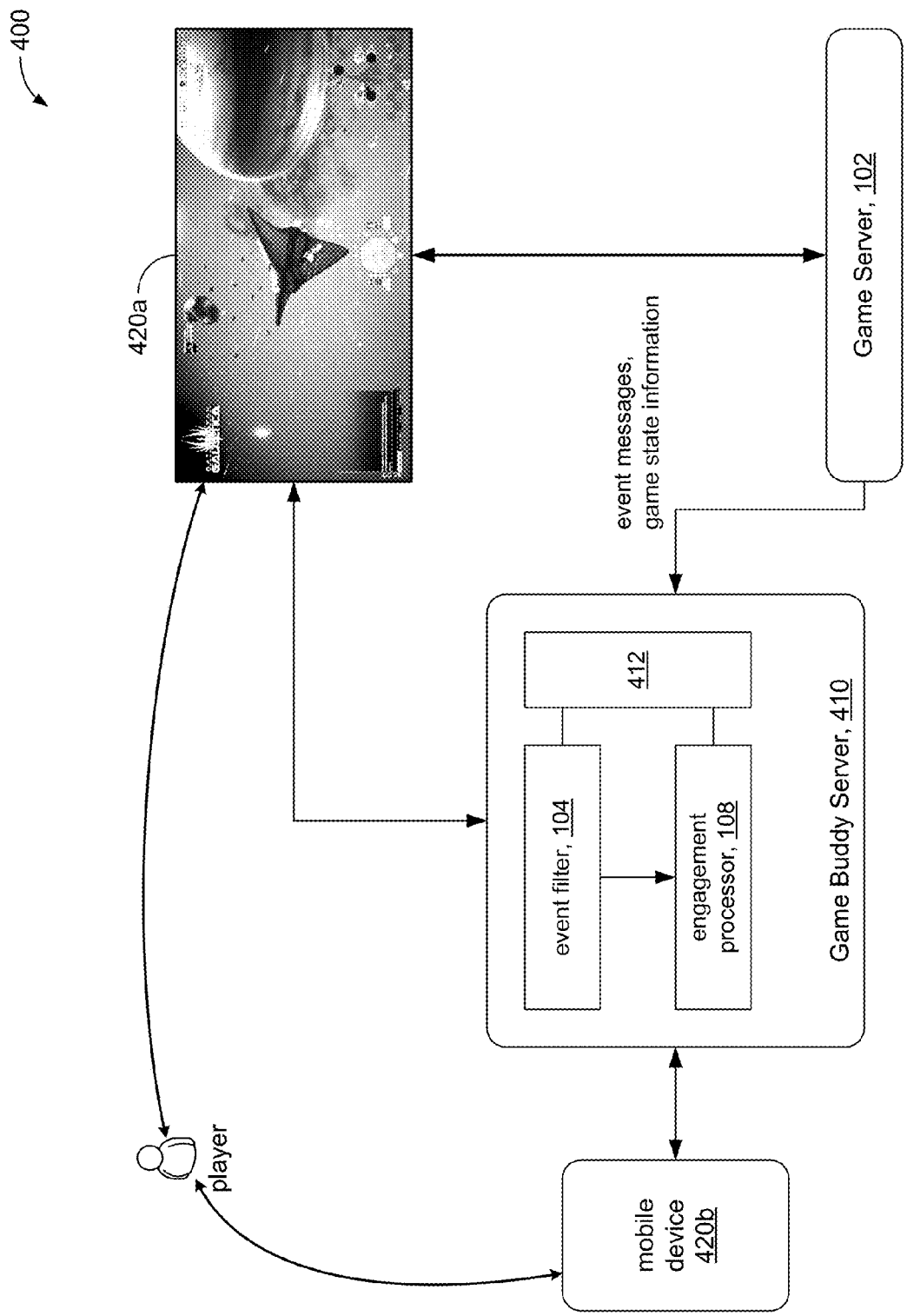
FIG. 4 shows another embodiment of a gaming system according to the present disclosure.

Referring to FIG. 4, in accordance with the present disclosure a gaming system 400 may include a "game buddy" that interacts with a player. The game buddy may serve as a coach to assist a novice player in learning about the game in terms of game philosophy, game mechanics, and so on. More experienced players may benefit from the game buddy by receiving hints from the game buddy or by learning about virtual items that can be obtained in the game, and so on.

The gaming system 400 may include a game buddy server 410 in communication with game server 102. The gaming system 400 may include a game interface 420a and a mobile computing device 420b. The game interface 420a may include a suitable display device to display video from the game server 102 during the course of game play. The game interface 420a may include suitable interface devices (e.g., mouse, keyboard, etc.) to receive input from a player during game play. As game play progresses on the gaming interface 420a, the game buddy server 410 may engage with the player during game play or after game play has concluded. In some embodiments, the game buddy server 410 may engage the player directly on the game interface 420a, for example, using an overlay or other suitable picture-in-picture technique. In other embodiment, the game buddy server 410 may engage the player via the mobile computing device 420b.

The game buddy server 410 may include an event processor 412, event filter 104, and engagement processor 108. The game server 102 may log various information during game play. For example, the logged information may be used by the game publisher to monitor progress of game play and the players. The logged information may relate to game performance and so on. In some embodiments, logged information generated by the game server 102 may feed into the event processor 412 as a stream of event messages and other game state information. The event processor 412 may process the event messages to generate internal events that the game buddy server 410 can act on. As a simple example, the game server 102 may send an event message "player A has been killed" to the game buddy server 410, in which case the corresponding internal event may simply be "player A has been killed". The event processor 412 may process complex sequences of event messages generated by the game server 102. For example, a sequence of event messages from the game server 102 may be processed by the event processor 412 to generate more specific internal events in the game buddy server 410 such as "player A is trapped in building XYZ", or "spaceship 123 does not have sufficient fuel to reach its destination", and so on.

The event filter 104 may receive internal events from the event processor 412. In some embodiments, the event filter 104 may identify one or more predetermined internal events and trigger the engagement processor 108 to initiate an engagement with a player.

The engagement processor 108 may engage the player, for example, by conducting a dialogue with the player. More particularly, the engagement processor 108 may engage the player regarding the one or more predetermined events that led to triggering an engagement with the player. The engagement processor 108 may receive additional internal events from the event processor 412 so that the engagement processor may engage the player in a meaningful way by taking into account the context of the game play and game activity that led up to the occurrence of the one or more predetermined events.

Figure 5:
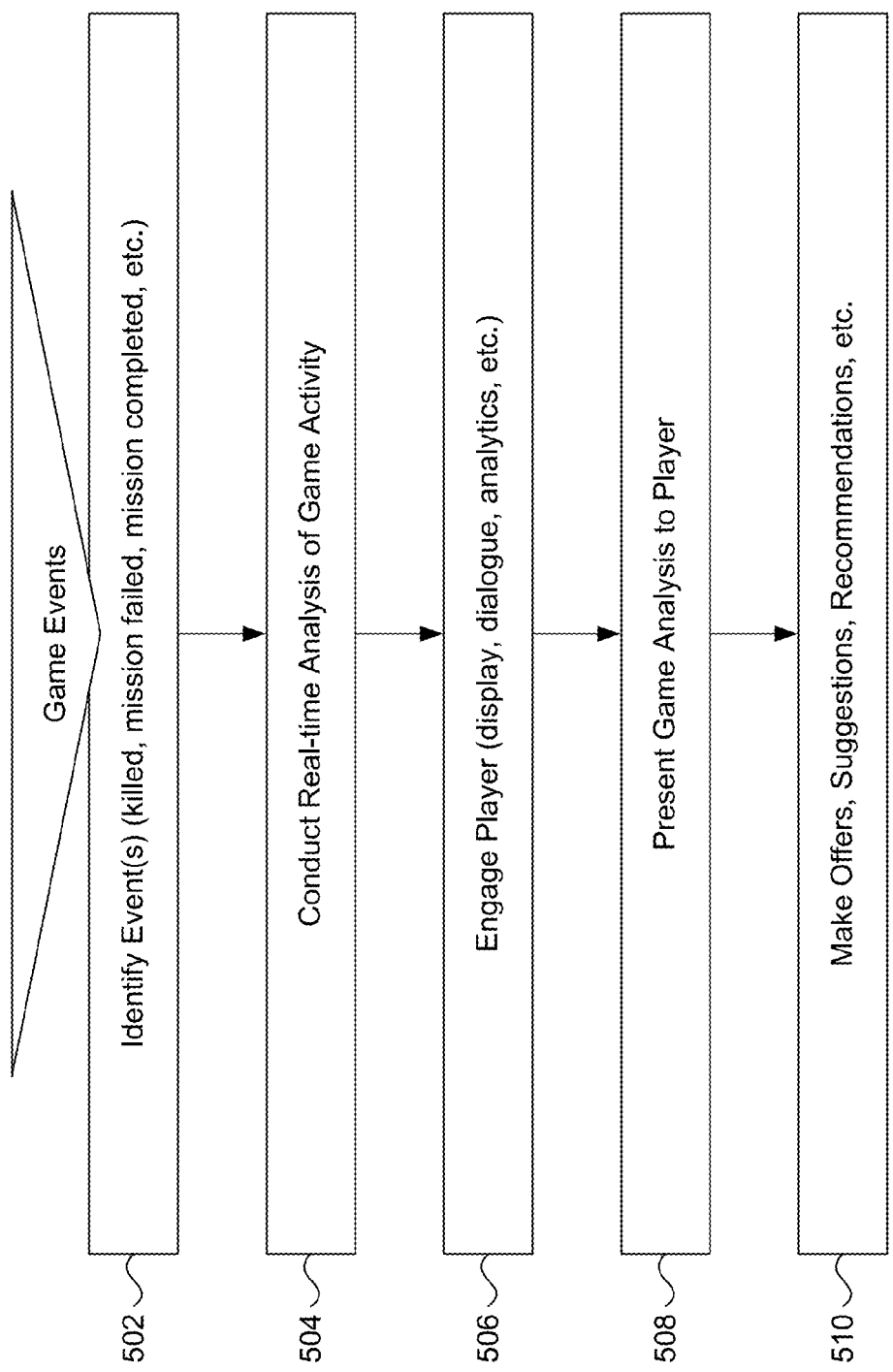
FIGS. 5 and 6 illustrate workflows according to the embodiment shown in FIG. 4.

Referring to FIG. 5, in some embodiments, the game buddy server 410 may operate according to a workflow shown in the figure. Thus, game events (e.g., generated by the event processor 412) may feed into the event filter 104 during game play. At 502, the event filter 104 may then identify one or more predetermined events as a criterion for triggering engagement with a player; e.g., the player is killed during game play, or a mission or quest has concluded (either successfully or in failure), a group activity (e.g., a battle in a battle group) has concluded, and so on. In accordance with principles of the present disclosure, the triggering event(s) may be any suitable event. In some embodiments, the triggering event(s) may be events that are deemed to frustrate the player (e.g., getting killed, failing in a mission) and thus create a risk for churn where the player leaves the game. Such events provide an opportunity to assist the player in order to improve their gaming experience and thus continue to play the game. The triggering events may be events that provide an opportunity to increase the player's involvement in the game, or increase the player's likelihood of making a payment in the game to purchase virtual game items, and so on.

At 504, the event processor 412 may conduct a real-time analysis of game activity during game play. In some embodiments, the analysis may include an analysis of game activity prior to the occurrence of the one or more predetermined events identified at 502. The analysis is "real time" in that game state information received from the game server 102 may be collected and aggregated during game play. For example, a player's consumption of ammunition may be tracked as the player uses up their ammunition, a player's travels in the game world may be recorded as the player visits different locations, visitation activity in a building may be recorded as players enter and leave the building, and so on. The analysis may include computing statistics (e.g., rates of consumption, averages, distributions, etc.) and generating other analytics (e.g., tables, charts, etc.) from the collected/aggregated game state information.

At 506, the engagement processor 108 may engage the player, for example, by initiating a dialogue between the gaming system 400 and the player. In some embodiments, the dialogue may be presented using a non-player character (NPC) avatar. The NPC avatar may be graphically represented on the game display 420a or mobile computing device 420b as an animated character, or as computer graphic (e.g., icon). The NPC avatar may simply be the text that constitutes the dialogue generated by the gaming system 400.

In some embodiments, the gaming system 400, vis-à-vis the NPC avatar, may initiate a "post game" dialogue, after game play has concluded for the player; e.g., by virtue of the player having been killed, or when a mission has completed, etc. It is noted that in some embodiments, although game play may have concluded for the player, game play nonetheless may continue for other players. The gaming system 400 may initiate an "in-game" dialogue with the player during their life in the game. In some embodiments, the event processor 412 may recognize predetermined player situations and trigger an event to initiate a dialogue. For example, the event processor 412 may detect that the player is about to engage in a battle against overwhelming odds. Prior to the player engaging in such a battle, the gaming system 400 may initiate a dialogue with the player regarding the battle. As another example, the event processor 412 may detect that the player is in a "trapped" situation (e.g., lost in a cave, cannot get into a building, and so on) and initiate a dialogue with the player regarding their situation. It will be appreciated that the event processor 412 may detect other player situations that may be suitable for a dialogue with the player.

At 508, the engagement processor 108 may present game analytics generated at 504 during the dialogue session between the gaming system 400 and the player. For example, when a player experiences an event (e.g., the player's mission concluded in failure), the engagement processor 108 may engage the player by providing relevant game analytics to the player. If the player engaged in battle, their battle performance may be displayed; e.g., how many of the enemy were killed, how many damage points did the player take, what were the enemies' skill levels, etc. If the player was playing against a clock, the game analytics may include how quickly the player progressed from one point in the game to the next. And so on.

At 510, the gaming system 400, vis-à-vis the NPC avatar, may provide the player with suggestions or recommendations to improve their game play; e.g., by suggesting training missions to learn more about the game mechanics, recommending upgrades or enhancements to their inventory, and so on. The gaming system 400 may make offers to the player to purchase additional weaponry, upgrades, ammunition, maps, keys, and other virtual game items in order to enhance their experience in the game.

Figure 6:
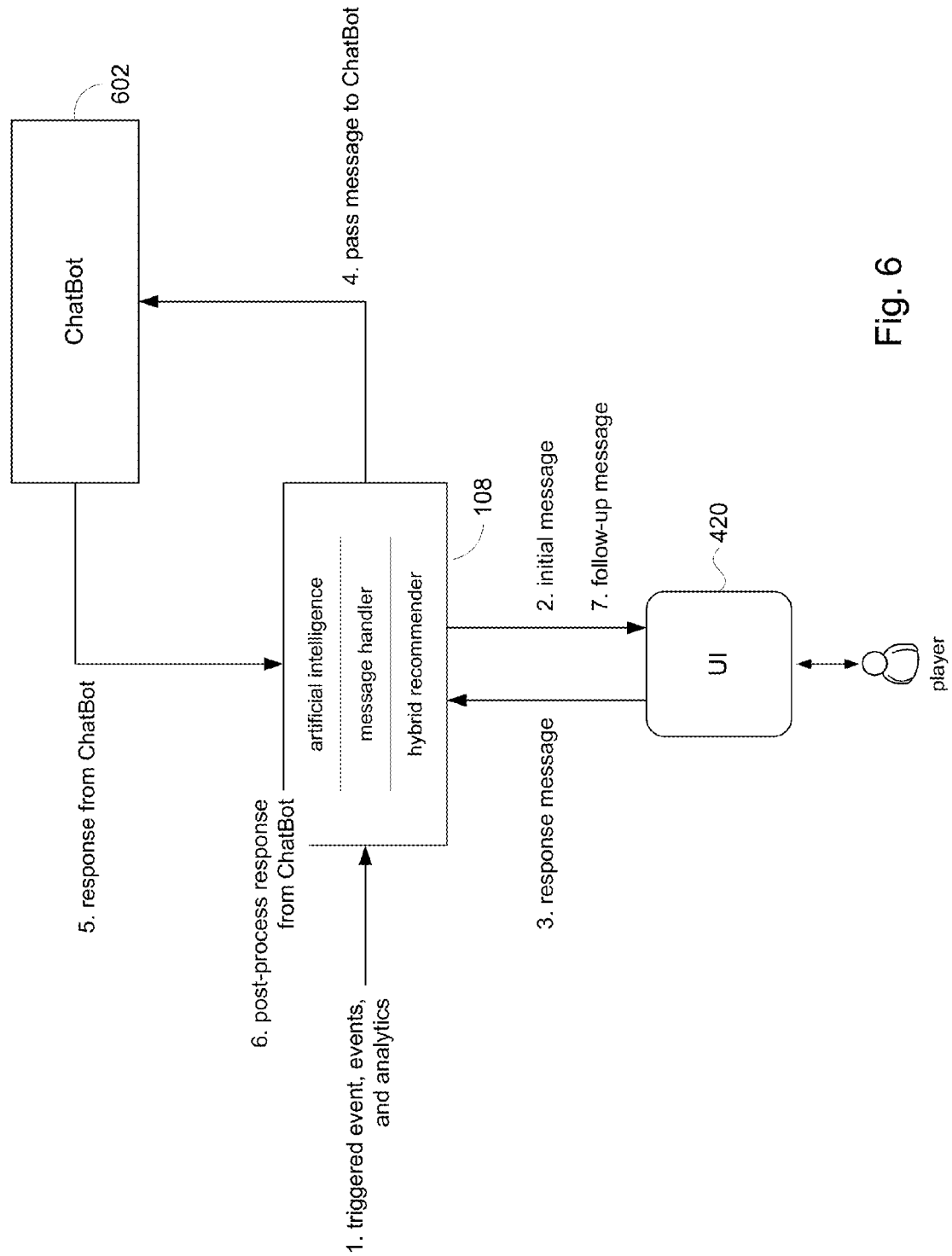

In some embodiments, as shown in FIG. 6, the engagement processor 108 may communicate with a chatbot 602 to generate dialogue with the player. As generally understood, a chatbot is a conversational system typically driven by artificial intelligence (AI, implemented in a software system for example) that can carry on a dialogue with a user. In an embodiment, the chatbot 602 is a Pandorabot hosted by the well-known Pandorabot web service on the Internet. In another embodiment, the SitePal web service was used to provide the NPC avatar and the chatbot technology. The typical workflow for engaging the player is illustrated in FIG. 6 and summarized below:

1. Events and analytics generated by the event processor 412 (FIG. 4) may feed into the engagement processor 108. A triggered event identified by the event filter 104 may identify the player with whom the engagement processor 108 will engage.
2. An AI component in the engagement processor 108 may use the events and analytics generated at 1 to determine that a dialogue with the player is called for. A message handling component in the engagement processor 108 may initiate an engagement with the player by sending an initial message to the player's UI 420, thereby initiating a dialogue between the gaming system 400 and the player. The UI 420, for example, may be the game interface 420a or the mobile computing device 420b.
3. The player may send a response message to the engagement processor 108, thereby establishing a dialogue with the gaming system 400.
4. The message handling component in the engagement processor 108 may pass the message to the chatbot 602 to generate a response.
5. The engagement processor 108 may receive a response message from the chatbot 602.
6. The engagement processor 108 may process the response message received from the chatbot 602. For example, the engagement processor 108 may simply pass the message to the UI 420. The engagement processor 108 may analyze the response message and enhance the response. The engagement processor 108 may determine that a recommendation or offer is appropriate and enhance the response message accordingly. And so on.
7. The engagement processor 108 may send a follow-up message to the UI 420 to continue the dialogue with the player. The follow-up message may be dialogue from the chatbot 602, may be a recommendation or offer produced by the engagement processor 108, may include analytics generated by the event processor 412, combinations of the foregoing, etc.

Figure 7:
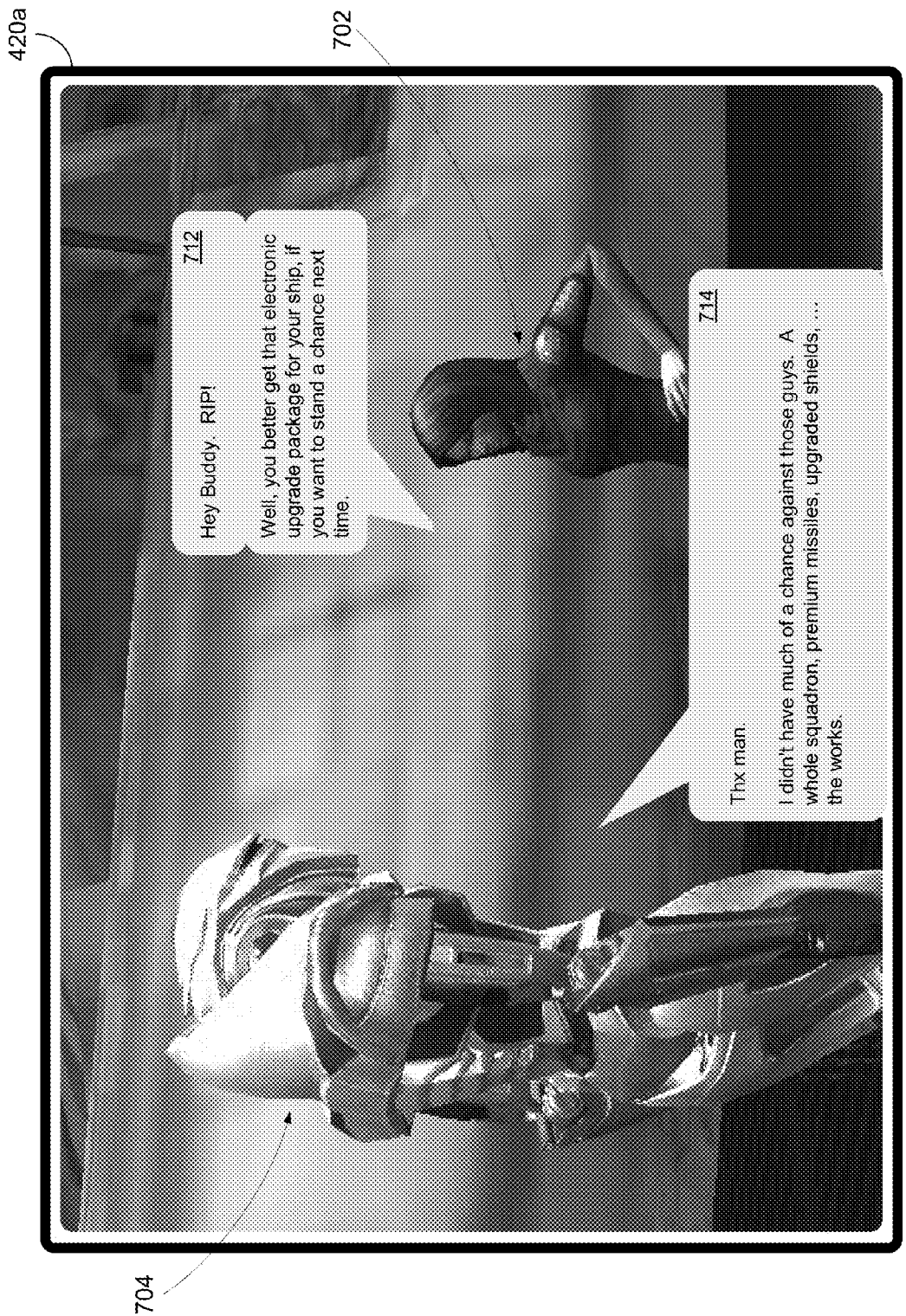
FIG. 7 illustrates an example of dialogue between an non-player character avatar and a player's avatar.

FIG. 7 illustrates an example of the gaming system 400 engaging, vis-à-vis an NPC avatar 702, the player's avatar 704 in a dialogue on the game interface 420a. Game play for the player is presumed to have concluded; as the dialogue indicates, the player was killed. Accordingly, the game interface 420a may display the NPC avatar 702 and the player's avatar 704. The game interface 420a may display speech (dialogue) balloons 712, 714, one for the NPC avatar 702 and another one for the player's avatar 704. Dialogue that is generated by the gaming system 400 may be displayed as text in the speech balloon 712 of the NPC avatar 702. The player may respond by typing in their response, which may then be displayed in the speech balloon 714 of the player's avatar 704. In some embodiments, the NPC avatar 702 may "talk" to the player using voice synthesis in addition to, or instead of, communicating with the speech balloon 712. Likewise, in some embodiments, the game interface 420a may have voice recognition, so that the player can speak to the NPC avatar 702. The player's converted speech can be displayed the speech balloon 714, so the player can confirm and, if necessary, correct the converted speech.

Figures 8A, 8B:
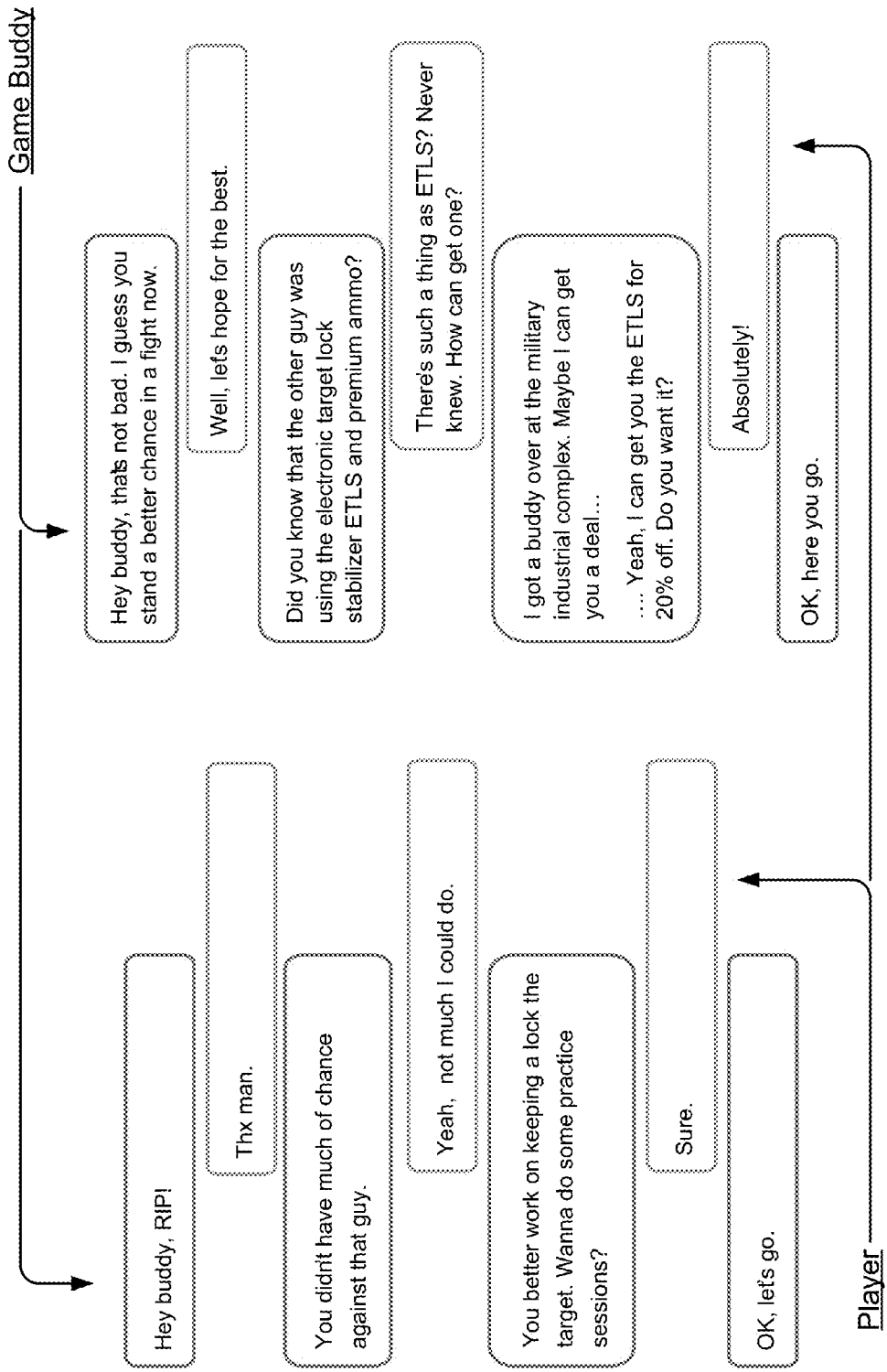
FIGS. 8A and 8B illustrate dialogue examples.

FIGS. 8A and 8B illustrate two related dialogue sessions. The setup for the illustrative dialogue session shown in FIG. 8A is that the player has been killed. The gaming system 400 has analyzed the player's performance and determined that the player's shooting accuracy is too low. Accordingly, the gaming system 400 may engage (e.g., via NPC avatar 702) the player and may recommend appropriate practice sessions to improve the player's shooting skills.

FIG. 8B illustrates a follow up dialogue that may take place after the player has participated in the recommended practice sessions. The figure illustrates that the gaming system 400 can encourage the player to continue playing by giving positive feedback. The figure further illustrates an example of the gaming system 400 having identified an opportunity to offer the sale of virtual game items. For example, as illustrated in the figure, the gaming system 400 may alert the player that the enemy was in possession of superior weaponry, and offer the player an opportunity to purchase upgraded weaponry for the next battle. As can be appreciated from the dialogue examples shown in FIGS. 8A and 8B, the NPC avatar may engage the player in a very natural way (e.g., by engaging in idle conversation), but in a way that attempts to drive the player toward a better game experience, e.g., by working on their skills, finding the right equipment to purchase, and so on.

Figure 9A:
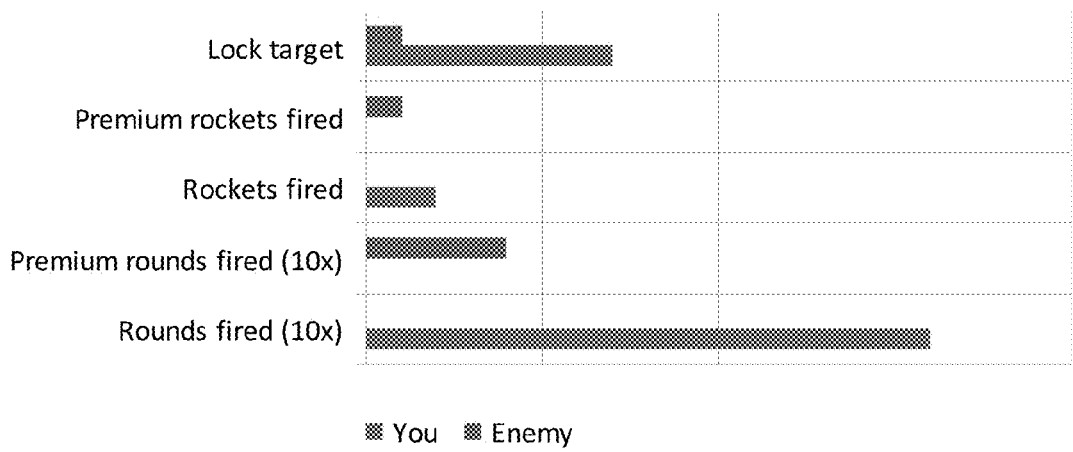
FIGS. 9A and 9B illustrate examples of game play analytics.
Figure 9B:
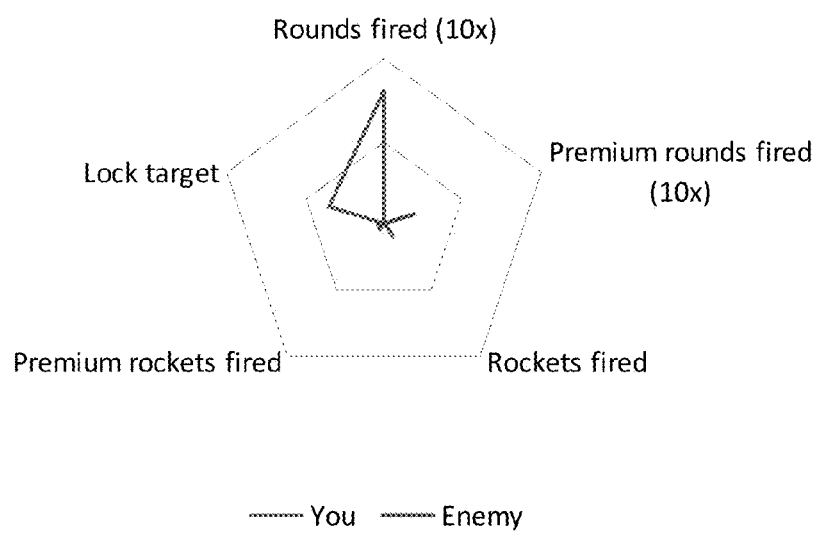
Figure 10:
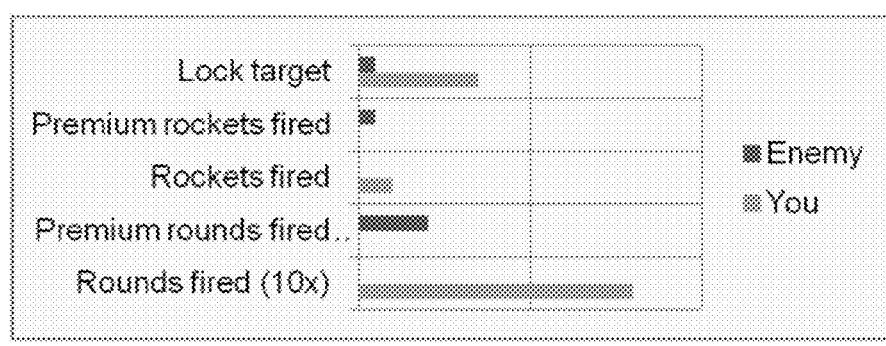
FIG. 10 illustrate an example of incorporating analytics into the dialogue.

FIGS. 9A and 9B illustrate examples of typical analytics that the gaming system 400 may generate from events and other game state information collected during game play. FIG. 9A shows a comparison of usage statistics between the player and the player's enemy, organized in tabular form. FIG. 9B represents the tabularized information shown in FIG. 9A in a graphical manner. As another example, "success" metrics of successful players may be presented. In some embodiments, for example, statistics may be gathered from players who are deemed to be successful in their game play, such as number of successful missions vs. failed missions, number of kills vs. number of times killed, and so on. The gaming system 400 may use such metrics as opportunities to make recommendations for the purchase of virtual items (e.g., maps, weapons, potions, etc.) that the success players have purchased. It will be appreciated that in general any other suitable analytics may be computed, such as statistics and other metrics. The dialogue between the gaming system 400 and the player may incorporate such analytics when appropriate. FIG. 10, for example, illustrates an example of analytics being incorporated in the dialogue.

Figure 11:
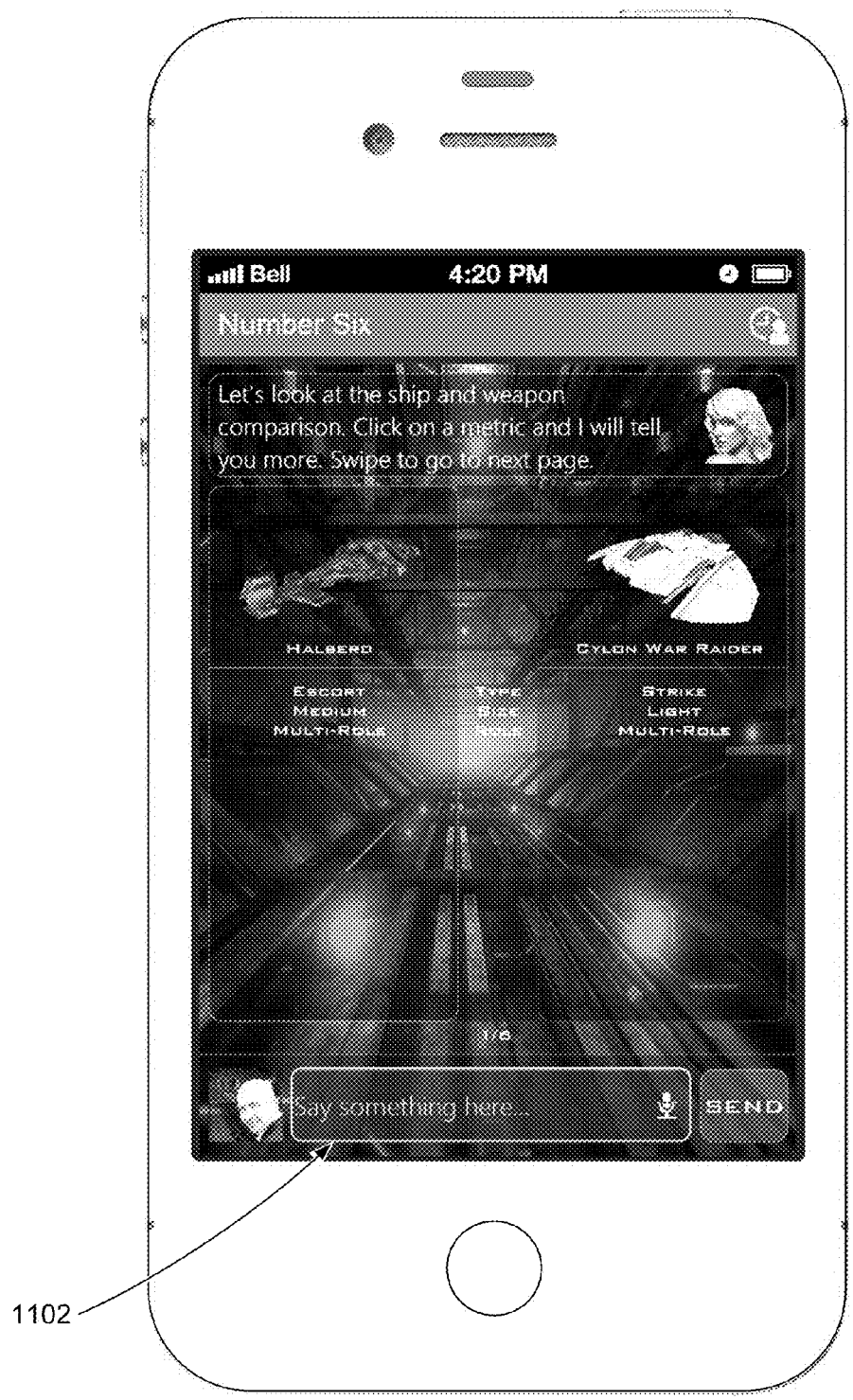
FIGS. 11 and 12 show examples of player engagement using a mobile computing device.
Figure 12:
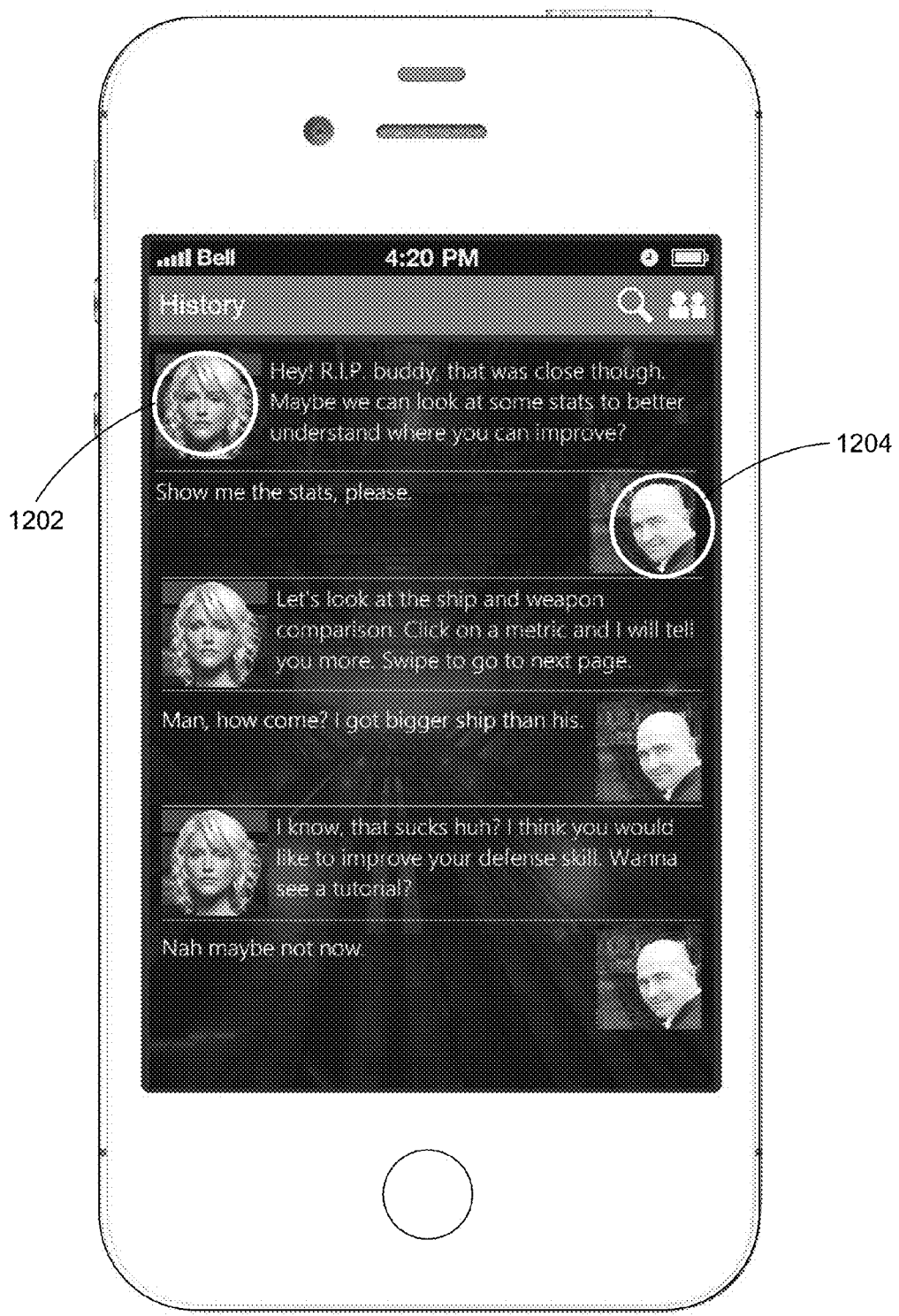

FIGS. 11 and 12 illustrate examples of the UI 420 (FIG. 6) provided on a mobile computing device such as, for example, smart phones, computer tablets, and so on. The mobile computing device shown in FIG. 11 illustrates voice recognition capability. As the player speaks their message, the converted speech may be displayed in area 1102. A SEND button allows the player to send the converted speech to the gaming system 400.

The mobile computing device shown in FIG. 12 illustrates an example of a text-based dialogue. In place of the graphical avatars 602, 604 shown in FIG. 6, the mobile computing device in FIG. 12 employs iconic avatars 1202 and 1204 to represent, respectively, the gaming system 400 and the player.

Figure 13:
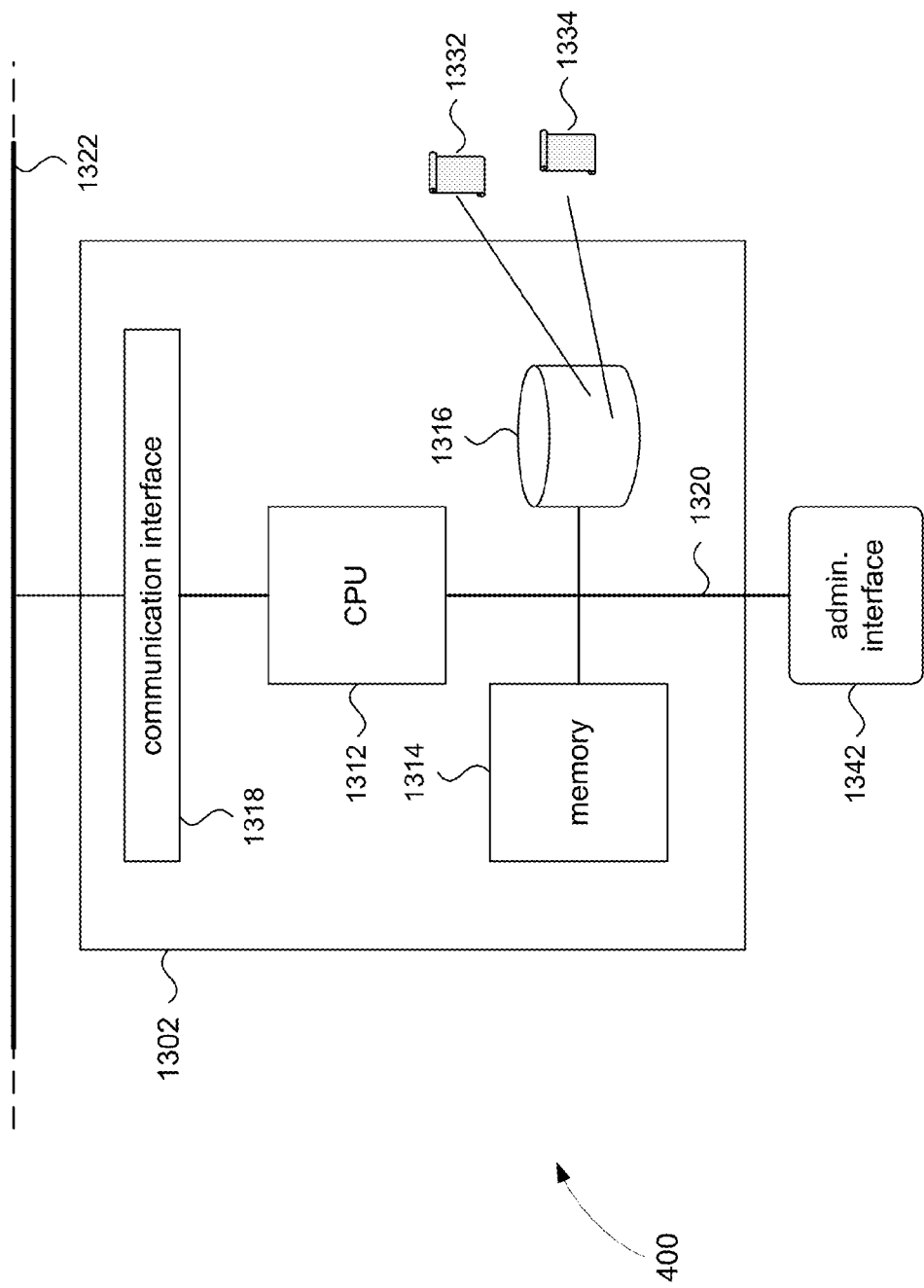
FIG. 13 illustrates a specific embodiment of the gaming system of FIG. 4.

FIG. 13 illustrates a high level block diagram of a computer system 1302 configured and programmed to operate as gaming system 400 in accordance with the present disclosure. The computer system 1302 may include a central processing unit (CPU) 1312 or other similar data processing component. The CPU 1312 may be a single processor or a multiprocessor subsystem. The computer system 1302 may include various memory components. For example, the memory components may include a volatile memory 1314 (e.g., random access memory, RAM) and a data storage device 1316. An internal bus 1320 may interconnect the components comprising the computer system 1302.

A communication interface 1318 may be provided to allow the computer system 1302 to communicate over a communication network 1322, such as a local area network (LAN), the Internet, and so on, allowing players to access the computer system 1302 over the Internet. In some embodiments, the communication interface 1318 may provide game access (e.g., over the Internet) via the game interface 420a (FIG. 4). In some embodiments, the communication interface 1318 may provide messaging between the gaming system 400 and the player's mobile computing device (e.g., 420b).

The data storage device 1316 may comprise a non-transitory computer readable medium having stored thereon computer executable program code 1332. The computer executable program code 1332 may be executed by the CPU 1312 to cause the CPU to perform steps of the present disclosure, for example the workflows set forth in FIGS. 5 and 6. The data storage device 1316 may store various data structures 1334 including, for example, game state information and game events. The data storage device 1316 may represent either or both the state information data store 206 and the events data store 208.

The system administrator 112 may interact with the computer system 1302 via an administrative interface 1342, including for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a gaming system comprising operating a computer system in the gaming system to perform steps of:
   receiving from a game server event information relating to game events occurring during game play among a plurality of players conducted by the game server;
   detecting an occurrence of one or more predetermined game events involving a first player;
   in response to the occurrence of the one or more predetermined game events, engaging the first player in a dialogue with the gaming system by sending an initial message to the first player relating to the occurrence of the one or more predetermined game events; and
   receiving a response message from the first player subsequent to sending the initial message to the first player thereby creating a dialogue between the gaming system and the first player,
   wherein the dialogue between the gaming system and the first player comprises an exchange of messages between the first player and the gaming system,
   wherein the dialogue includes presenting a comparative analysis of performance of the first player and performance of a second player,
   wherein the dialogue further includes offering for sale one or more virtual game items for use by the first player during game play.

2. The method of claim 1 wherein the dialogue between the gaming system and the first player includes providing to the first player additional analyses of game activity relating to the occurrence of the one or more game events.

3. The method of claim 2 wherein the analysis includes one or more charts that are presented to the first player.

4. The method of claim 1 wherein the dialogue between the gaming system and the first player includes offering virtual game items to the first player that are based on the one or more predetermined game events.

5. The method of claim 1 wherein the dialogue between the gaming system and the first player includes offering assistive information relating to the one or more predetermined game events.

6. The method of claim 1 wherein the dialogue between the gaming system and the first player occurs during game play.

7. The method of claim 1 wherein the dialogue between the gaming system and the first player comprises displaying a non-player character (NPC) avatar on a game display of the gaming system, wherein the NPC avatar exchanges messages with the first player.

8. The method of claim 1 wherein the dialogue between the gaming system and the first player comprises sending messages from the gaming system to a mobile computing device and sending messages from the mobile computing device to the gaming system.

9. The method of claim 1 wherein messages, including the initial message, sent to the first player are generated by a chatbot, wherein messages from the first player, including the response message, are sent to the chatbot.

10. A gaming system comprising:
   a computer system;
   a data storage device having stored thereon computer-executable program code, which, when executed by the computer system, causes the computer system to:
      receive from a game server event information relating to game events occurring during game play among a plurality of players conducted by the game server;
      detect an occurrence of one or more predetermined game events involving a first player;
      in response to the occurrence of the one or more predetermined game events, engage the first player in a dialogue with the gaming system by sending an initial message to the first player relating to the occurrence of the one or more predetermined game events; and
      receive a response message from the first player subsequent to sending the initial message to the first player thereby creating a dialogue between the gaming system and the first player,
      wherein the dialogue between the gaming system and the first player comprises an exchange of messages between the first player and the gaming system,
      wherein the dialogue includes presenting a comparative analysis of performance of the first player and performance of a second player,
      wherein the dialogue further includes offering for sale one or more virtual game items for use by the first player during game play.

11. The system of claim 10 wherein the dialogue between the gaming system and the first player includes providing to the first player additional analyses of game activity relating to the occurrence of the one or more game events.

12. The system of claim 10 wherein the dialogue between the gaming system and the first player includes offering virtual game items to the first player that are based on the one or more predetermined game events.

13. The system of claim 10 wherein the dialogue between the gaming system and the first player includes offering assistive information relating to the one or more predetermined game events.

14. The system of claim 10 wherein the dialogue between the gaming system and the first player comprises displaying a non-player character (NPC) avatar on a game display of the gaming system, wherein the NPC avatar exchanges messages with the first player.

15. The system of claim 10 wherein the dialogue between the gaming system and the first player comprises sending messages from the gaming system to a mobile computing device and sending messages from the mobile computing device to the gaming system.

16. A non-transitory computer-readable storage medium having stored thereon computer executable program code, which, when executed by a computer system, causes the computer system to perform steps of:
   receiving from a game server event information relating to game events occurring during game play among a plurality of players conducted by the game server;
   detecting an occurrence of one or more predetermined game events involving a first player;
   in response to the occurrence of the one or more predetermined game events, engaging the first player in a dialogue with the gaming system by sending an initial message to the first player relating to the occurrence of the one or more predetermined game events; and
   receiving a response message from the first player subsequent to sending the initial message to the first player thereby creating a dialogue between the gaming system and the first player,
   wherein the dialogue between the gaming system and the first player comprises an exchange of messages between the first player and the gaming system,
   wherein the dialogue includes presenting a comparative analysis of performance of the first player and performance of a second player,
   wherein the dialogue further includes offering for sale one or more virtual game items for use by the first player during game play.

17. The non-transitory computer-readable storage medium of claim 16 wherein the dialogue between the gaming system and the first player includes offering virtual game items to the first player that are based on the one or more predetermined game events.

18. The non-transitory computer-readable storage medium of claim 16 wherein the dialogue between the gaming system and the first player includes offering assistive information relating to the one or more predetermined game events.

19. The non-transitory computer-readable storage medium of claim 16 wherein the dialogue between the gaming system and the first player comprises displaying a non-player character (NPC) avatar on a game display of the gaming system, wherein the NPC avatar exchanges messages with the first player.

20. The non-transitory computer-readable storage medium of claim 16 wherein the dialogue between the gaming system and the first player comprises sending messages from the gaming system to a mobile computing device and sending messages from the mobile computing device to the gaming system.

* * * * *